United States Patent [19]

Staff et al.

[11] 4,051,959
[45] Oct. 4, 1977

[54] SYSTEM FOR HANDLING GOODS ON CARRIERS FOR COMBINED RAILWAY AND OVERLAND TRANSPORTATION

[75] Inventors: Finn Staff, Ski, Norway; Christer Svensson, Laholm, Sweden

[73] Assignees: Linjegods A/S, Oslo, Norway; Lagaholm AB, Laholm, Sweden

[21] Appl. No.: 669,990

[22] Filed: Mar. 24, 1976

[30] Foreign Application Priority Data

Mar. 24, 1975 Norway .................................. 751020

[51] Int. Cl.² ............................................. B65G 67/02
[52] U.S. Cl. .............................. 214/38 BA; 214/38 D; 214/516
[58] Field of Search ............ 214/38 B, 38 BA, 38 BB, 214/38 C, 38 D, 83.3, 516; 104/162

[56] References Cited

U.S. PATENT DOCUMENTS

| | | | |
|---|---|---|---|
| 2,087,249 | 7/1937 | Fitch | 214/38 D |
| 3,175,718 | 3/1965 | Dempster et al. | 214/516 |
| 3,724,697 | 4/1973 | Arvidsson | 214/512 |

*Primary Examiner*—Robert G. Sheridan
*Attorney, Agent, or Firm*—Young & Thompson

[57] ABSTRACT

In a system for handling goods on carriers for combined railway and overland transportation, the use of a truck having its own pulling/pushing device for pulling-/pushing the carriers in the longitudinal direction of the truck from a railway car, across the latter and over onto the truck's platform and the other way around. The carriers have connecting means for coupling with the pulling/pushing device. The truck has a carrying platform which can be raised and lowered to adjust the height of the railway car's loading platform.

5 Claims, 17 Drawing Figures

SYSTEM FOR HANDLING GOODS ON CARRIERS FOR COMBINED RAILWAY AND OVERLAND TRANSPORTATION

The invention relates to a system for handling goods on carriers for combined railway and overland transportation. Combined railway and overland transportation, i.e. the use of both railway cars and trucks over a transportation stretch will often be preferable, because the advantages of the two types of transportation can be utilized in an optimum way. One disadvantage with combined transportation of this sort is, however, the necessary reloading. In order to facilitate or to completely eliminate reloading, a number of types of vehicles and railway cars have been proposed which make it possible to run the same car both on the railway and on the road. No satisfactory solutions have been found, however, in this sector, and the development is concentrated therefore today on the use of carriers, i.e. containers, pallets and the like, whereby the goods can relatively simply be reloaded from railway to truck and the other way around. One disadvantage with pallets, smaller cartons and the like is that they require lifting equipment, e.g. fork trucks, which must be on hand at the reloading place. With regard to containers, these require today special lifting equipment, for instance, portal cranes or large fork trucks. The usual containers today are relatively large. One very ordinary type is the so-called 20-foot container which requires powerful lifting equipment.

The usual large containers today will often be too big, i.e. that in reality the entire cubic content of the container is not always used. Investigations have shown that a container size with a base of approximately 3.5 × 2.5 m and a height of 2 - 3 m often is sufficient.

The need for special lifting equipment at each reloading place has resulted in a considerable reduction of possible reloading places, so that it has not been possible to fully utilize the advantages which combined railway and overland transportation have to offer. The invention aims at remedying this need and does this by eliminating the need for independence lifting equipment at the reloading places. The aim of the invention is to provide a system whereby the two transportation means themselves have the necessary equipment for reloading.

According to the invention a system is accordingly provided for handling goods on carriers for combined railway and overland transportation, and the system is characterized in that the trucks which are used have their own pulling/pushing device for pulling/pushing carriers in the longitudinal direction of the truck, from the railway car, across the latter and onto the surface of the truck and the other way around. The carriers have connecting members for coupling with the pull/push device. In order to adapt to the height of the railway car's loading area, the truck has, as known per se, a carrying platform which can be raised and lowered.

The system is best utilized when the dimension of the carrier, calculated across the railway car, is equal to the width of the normal railway profile, and when the longitudinal direction of the railway car, i.e. in the transverse direction of the truck, the dimension equals the maximum normal vehicle width. E.g. the width of a normal railway profile is 3,400 mm, with possibilities for a certain increase beyond this, and an allowed maximum vehicle width is today 2,500 mm. Carriers, whether they be pallets or containers with these dimensions are to be preferred, but the system is not tied to the use of carriers with these dimensions even if these dimensions as mentioned have advantages, not only with respect to the volume of freight which can be taken on the carrier, but also with respect to the normal values which today are usually applied within the transportation sector. The vehicle's own pulling/pushing device is preferably built into a carrying platform which can be lifted and lowered. This makes for a simple and reasonable construction.

In a preferable embodiment the pulling/pushing device comprises a sled which can be moved in the longitudinal direction of the truck in guides in the carrying platform which can be raised and lowered. In order to make the movement of the sled easier, it is preferably mounted on wheels in the guides in the carrying platform which can be raised and lowered.

A preferable construction is obtained when the carrying platform which can be raised and lowered, consists of two profile beams which are held together and which are mutually distant and parallel with the longitudinal axis of the truck, and which at the same time form the guides for the sled. The sled which forms the actual pulling/pushing member, is preferably power-driven by means of a working cylinder. The working cylinder can be hydraulic or pneumatic.

The sled is preferably equipped with movable coupling means for interaction with coupling means on the carriers. In a preferable embodiment the movable coupling means of the sled are constructed as transversely displaceable pegs, i.e. transverse to the movement direction of the sled, while the coupling means on the carriers are corresponding recesses or holes in the carriers. In addition to the coupling effect, these pegs can also be used for locking the carriers on the truck.

Appropriately each carrier has in its bottom a steering tunnel which is adjusted to the sled and wherein the coupling means are placed. This steering tunnel can be a shallow, inverted groove in the bottom of the carrier, or can be formed by from the carrier bottom downward projecting profiles and the like.

In order to make the system side-independent, and also in order to lighten the transition between railway car and truck or the other way around by means of the pulling/pushing device, the coupling means are placed on both carrier sides, i.e. on both the carrier sides which lie along the railway car sides.

For steering of the carriers on the railway car during pulling/pushing, the loading platform of the railway car may to advantage have preferably detachable guide members. When the guide members are detachable, the railway car becomes more universally usable, because after the guide members are removed, it has its original flat loading platform.

Preferably, each guide member can comprise two parallel rails which interact with the steering tunnel of the carrier. In order to make the steering in of the carriers easier, the two rails can be bent obliquely inward toward each other at the ends, i.e. at each side of the railway car.

The carriers are centred on the railway car, so that they are symmetrical about the longitudinal axis of the railway car, and in order to obtain correct orientation at once of the truck's carrying platform in relation to the longitudinal axis of the railway car, the railway car is advantageously equipped with preferably detachable stoppers for the back end of the truck along each side of the car. Here, to advantage may be used the brackets railway cars usually are equipped with, as the stopper for example can have pegs for sticking into the brackets. Here also, a detachable construction is to be preferred, because the railway car thereby becomes more universally easy to use, and because both as regards the above mentioned guide members and the stoppers, one can use the usual railway cars of today.

The invention will be described more in detail with respect to the drawings. The drawings are purely diagrammatical and show only the details necessary for understanding of the new system. Additional advantages of the invention will also be illustrated more closely in connection with the description of the practical constructions.

The principle of the new system will be explained first in connection with FIGS. 1 – 6. A railway car 1 is standing on a track 2. On the railway car are placed five carriers in the form of containers 3, 4, 5, 6 and 7. The length of the containers calculated across the railway car is equal to the width of a normal railway profile, i.e. that its length is 3,4 m. The width of each container, calculated in the longitudinal direction of the railway car, is equal to 2.5 m, which is an acceptable maximum width for motor vehicles. The containers are approximately 2 m high. These dimensions can of course be varied and are intended here only as practical examples.

A truck 8 is backed up to the railway car 1, cross-wise to the railway car. The truck is equipped with a carrying platform 9 which can be raised and lowered. This carrying platform is connected with the frame 10 of the truck by means of pivotable joints 11. The carrying platform can be raised and lowered by means of working-cylinders which are not shown in FIGS. 1–6. Up to this point the truck embodies a well-known construction.

In the carrying platform 9 which can be raised and lowered is placed a sled, displaceable forwards and backwards in the longitudinal direction of the truck. More exact details for a preferable embodiment will be described in detail below. In order to understand the system it is sufficient to see clearly that the sled 12 can be moved along the platform 9 in the longitudinal direction of the truck. The desired movement of the sled may be provided by means of suitable power devices, preferably a hydraulic working cylinder. A construction of this sort will be described more in detail below.

Each container 3 – 7 has a longitudinal steering tunnel 13 in its bottom. This steering tunnel is adjusted to the sled, in such a way that the sled can be driven into the steering tunnel and be coupled with the container there. This coupling can be effected in many ways and will be described more in detail with reference to the more particularly disclosed embodiment.

The new system works in such a way that a truck of the type shown in FIGS. 1 – 6 backs up to the railway car, cross-wise to the latter so that the sled 12 can be guided to coupling contact with the loading platform 3. The loading platform 9 which can be raised and lowered, makes possible adjustment to the surface height of the railway car. In this way one is independent of the conditions at the reloading place.

Figure 1:
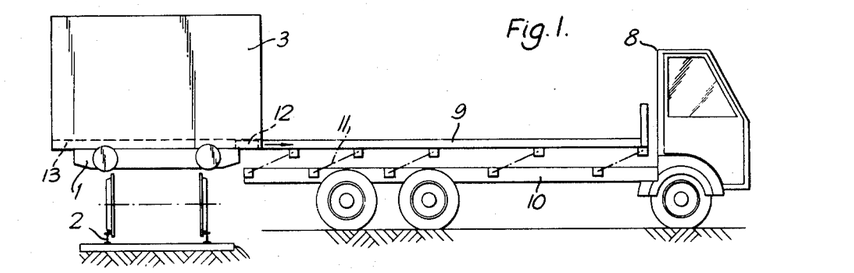
FIG. 1 shows a side view of a truck pulled up by a railway car.
Figure 2:
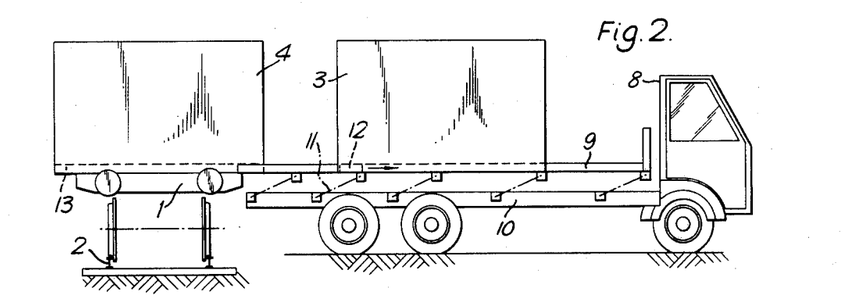
FIGS. 2 – 5 show different phases during reloading.

After the coupling between the container and the sled, the sled is drawn toward the driving compartment of the truck, as indicated by the arrow in FIG. 1. The container which is locked together with the sled, will be brought along and guided over onto the carrying platform 9. The container can be drawn as far over onto the truck as the length of stroke of a working cylinder, to be described later, will permit. If one wants to draw the container even farther in, a different hold on the container can be taken, i.e. to free the sled and move it to the other end side of the container and couple it together with the container there, as is shown in FIG. 1.

Figure 3:
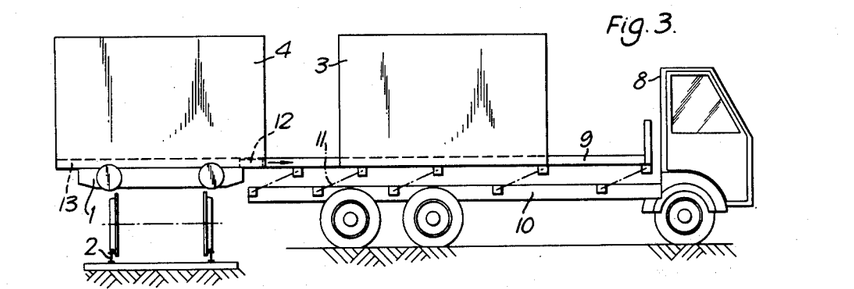
Figure 4:
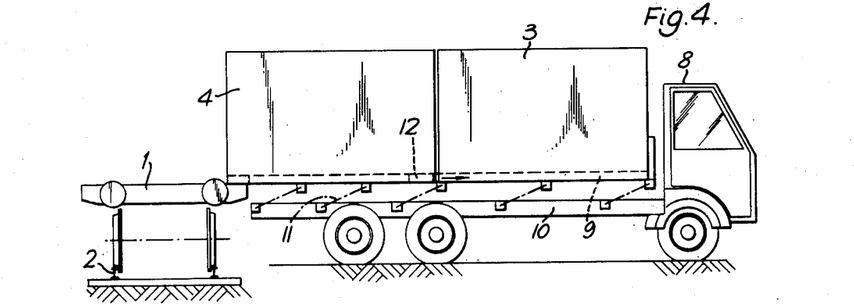
Figure 5:
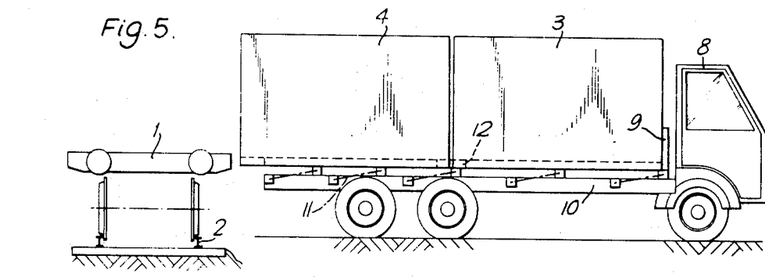

Afterwards the truck is moved into a corresponding position in relation to the container 4, the sled is driven to the end of the truck and is broughtinto coupling contact with the container, see FIG. 3, and the container 4 can then be drawn over onto the carrying platform 9. The container will then alert directly or indirectly against the container 3 and push the latter in front of it, all the way forward in the direction of the truck's driving compartment, as is shown in FIG. 4, where both containers are placed on the truck in transportation position. The truck then drives in this case slightly forward, and the carrying platform 9 is lowered, see FIG. 5. Ordinary peg systems are used to lock the containers onto the truck, and the sled 12 can also be used for locking, in that it is driven to the position which is shown in FIG. 5 where it can be coupled with both containers.

It is an advantage to dimension the carrying platform 9, the sled and its forward thrust device and the carriers in such a way in relation to each order that with as little change as possible the carriers can be brought over onto the truck on the railway car and the other way around.

When reloading from the truck to the railway car, one proceeds in the same way as described above, only in reverse order.

The new system is very favourable because it is flexible and is independent of the conditions at the reloading places, as long as the reloading place allows for driving up a truck into the desired position relative to the railway car. The essence of the system is the vehicle's own pulling/pushing device which in this case is represented by the sled 12.

The equipment of the truck and also some of the equipment which can be used to advantage for the railway car will now be explained more in detail.

Figure 7:
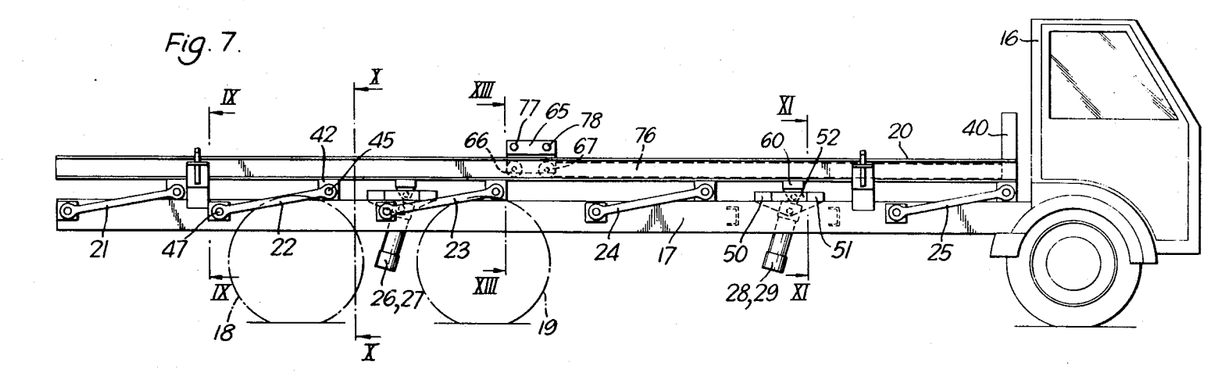
FIG. 7 shows a side view of a truck which can be used in the system.
Figure 8:
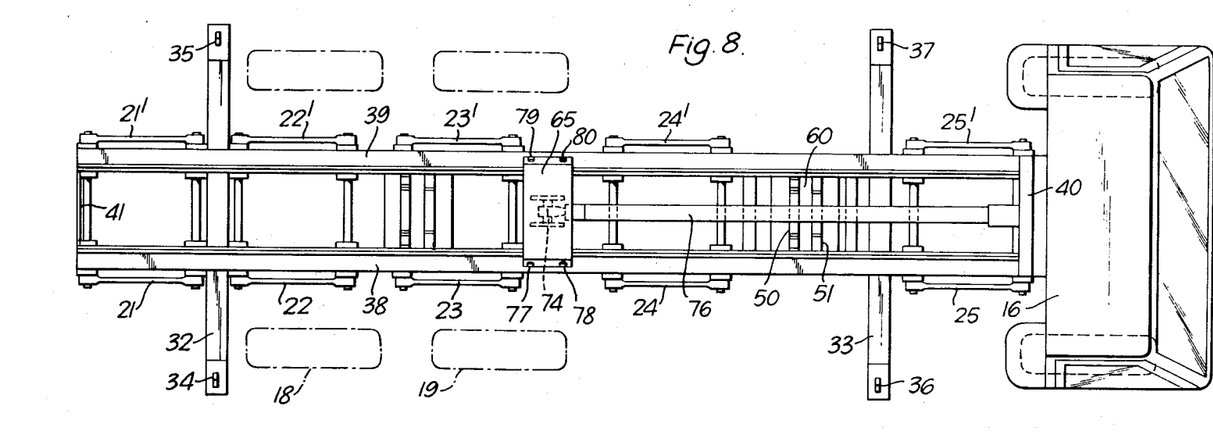
FIG. 8 shows a plan view of the truck in FIG. 7.
Figure 9:
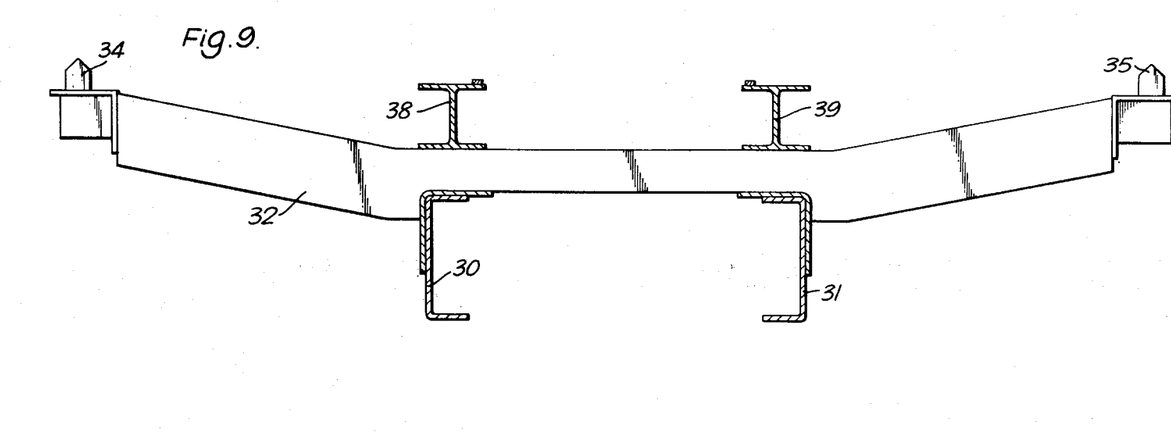
FIG. 9 shows a section along line IX—IX in FIG. 7.

FIGS. 7 and 8 show a truck 16 with a vehicle frame 17. For the sake of a general view, the back wheels 18, 19 are only roughly indicated with dotted lines. On the vehicle frame 17 is mounted a carrying platform 20. The carrying platform 20 is connected with the vehicle frame 17 by means of joint rods 21-25. In the vehicle frame are mounted four hydraulic working cylinders 26,27,28,29. Their respective piston rods are joint-connected with the carrying platform 20. By means of these working cylinders the carrying platform can be raised and lowered, as it is then controlled by the joint bars 21 – 25. Such joint bars are placed on both sides of the carrying platform 20, as can be seen in FIG. 8. The joint bars on the left side of the truck are designated by the same reference numbers as on the right side, with the addition of a prime character.

The vehicle frame 17 is built up as known per se of two longitudinal main beams 30, 31. The vehicle frame comprises moreover two sturdy cross-beams 32, 33 which extend sideways from the longitudinal main beams 30, 31 and are equipped at the ends with pegs 34, 35, 36, 37. At the ends, in the area by the pegs, the cross-beams are shaped as supporting stoppers and are located at the same height as the supporting surface of the carrying platform 20 which can be raised and lowered. The construction of the vehicle frame is so far completely conventional and therefore shall not be explained here further in detail.

Figure 10:
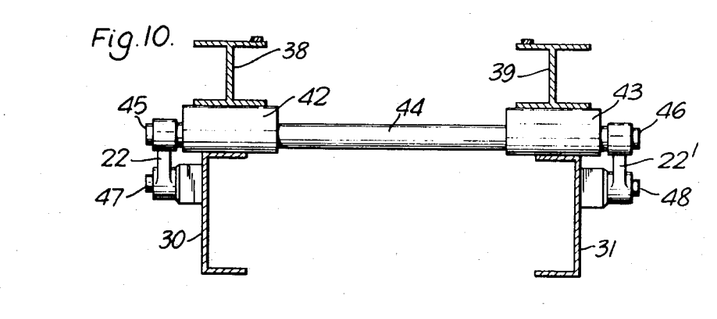
FIG. 10 shows a section along line X—X in FIG. 7.
Figure 11:
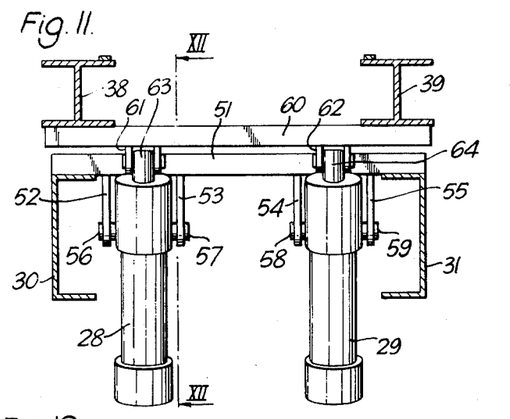
FIG. 11 shows a section along line XI—XI in FIG. 7.
Figure 12:
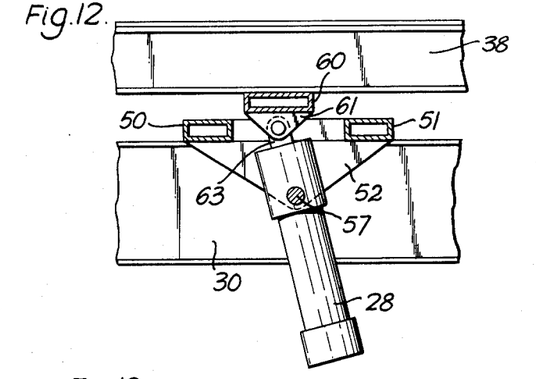
FIG. 12 shows a section along line XII—XII in FIG. 11.

As mentioned there is mounted on the vehicle frame 17 a construction which can be raised and lowered and which forms a carrying platform 20. This carrying platform 20 consists mainly of two longitudinal beams 38, 39 which are held together at their front end by means of a crosswise, terminating box construction 40. At their rear end the beams 38, 39 are held together by means of a plate 41. On the underneath side each beam is equipped with five box constructions 42, 43, see FIG. 10. These box constructions are similar and only one of them, the one shown in section in FIG. 10, will therefore be explained more in detail. Between the boxes 42, 43 extends a buttressing rod 44. On the free rod ends, which are shaped as axle pegs 45, 46 are pivotally mounted joint rods 22, 22', and these joint rods are at their other ends pivotally mounted on axle pegs, 47, 48 which are firmly mounted on the longitudinal supporting beams 30, 31 in the vehicle frame 17. As already mentioned, there are five such joint-rod devices, which act as guides during the raising and lowering of the carrying platform 20 by means of the four working cylinders 26, 27, 28 and 29. These working cylinders and their mounting in the vehicle frame 17 is shown more in detail in FIGS. 11 and 12. Two hollow profiles 50, 51 are fastened to and extend between the vehicle frame's supporting beams 30, 31. From the hollow profiles 50, 51 extend down four supporting plates 52, 53, 54, 55 and in these supporting plates the respective working cylinders 28, 29 are mounted so that they can be tipped by means of axle pegs 56, 57, 58, 59. A hollow profile 60 is fastened to the underside of the supporting platform's longitudinal beams 38, 39 and is on its underside equipped with two fastening ears 61, 62. In these fastening ears are pivotally attached the working cylinders' 28, 29 piston rods 63, 64. The two rear working cylinders 26, 27 are mounted in the same way as the forward working cylinders which have just been described.

The necessary conduits and other equipment for the use of the working cylinders are not showm, as this is regarded as a well known technique. When the working cylinders activated, i.e. that their piston rods are driven out, they will effect a lifting of the carrying platform 20, and during this raising movement the carrying platform 20 is controlled by the pairs of joint bars 21 – 25, 21' – 25'. By means of the working cylinders can accordingly the carrying platform 20 be brought to the desired height position.

Figure 13:
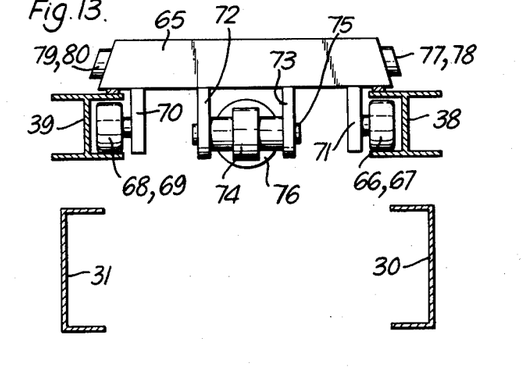
FIG. 13 shows a section along line XIII—XIII in FIG. 7.

A sled 65 is mounted in the carrying platform 20. The sled has four wheels 66, 67, 68, 69 which run on the bottom flanges of the longitudinal beams 38, 39 in the carrying platform 20, see FIG. 13. The sled 65 is in this case shaped as a box construction, with two brackets 70, 71 hanging down, where the four wheels 66– 69 are mounted, as is shown in FIG. 13. In addition two brackets 72, 73 extend down from the underside of the sled 65 itself, and the end of a piston rod 74 is connected to the sled between these two brackets by means of an axle 75. The piston rod 74 belongs to a long working cylinder 76 which is placed in the supporting platform 20 between two longitudinal beams 38 and 39, see also FIGS. 7 and 8. The working cylinder 76 is fastened to the box construction 40 of the supporting platform 20. In a manner not shown in detail, it can also be braced in relation to the beams 38, 39. By means of this working cylinder 76 the sled 65 can be driven from the position shown in FIGS. 7 and 8 to a position entirely at the rear end of the carrying platform 20 which can be raised and lowered. As is obvious, this sled 65 corresponds to the sled 12 previously mentioned in FIGS. 1 – 6, and the carrying platform 20 corresponds to the carrying platform 9 which can be raised and lowered in the same Figures.

The sled, as mentioned in this embodiment is shaped as a box-like construction, and the sled has four pegs 77, 78 and 79, 80 with two pegs on each side of the sled. These pegs can be displaced in the truck's transverse direction, and in FIG. 13 the pegs are shown in pushed out position. These pegs serve as coupling means for coupling together the sled and the carriers, as will be explained more in detail below. The embodiment shown of the sled is of course only an example, and the sled can be constructed in many other ways. The pegs can be displaced manually, possibly controlled by a lever, or by means of pneumatic or hydraulic power members. This is not shown, as up to this point it is a matter of using a well known technique.

Figures 6, 14:
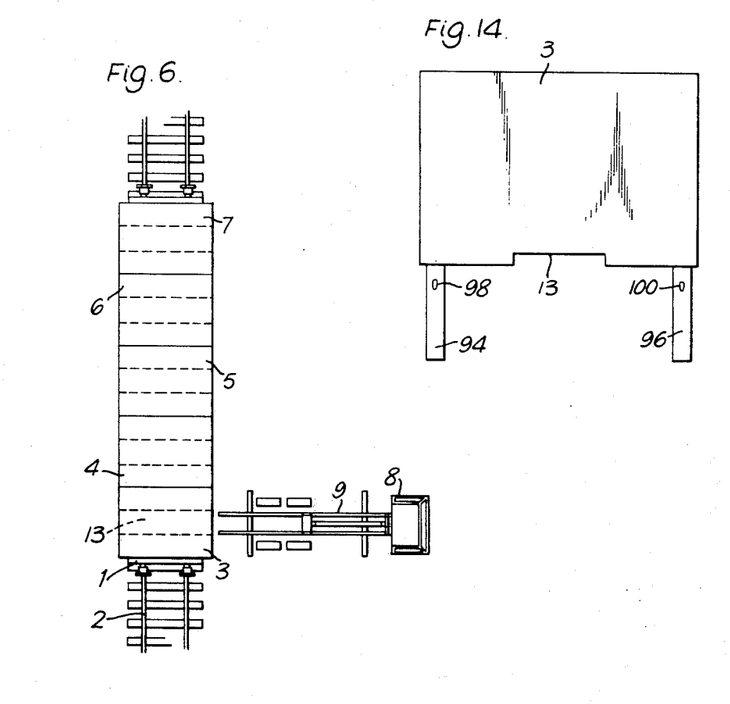
FIG. 6 shows the truck and the railway car in FIG. 1 seen from above, in smaller scale.
FIG. 14 shows an end view of a container which can be used in the system.
Figure 15:
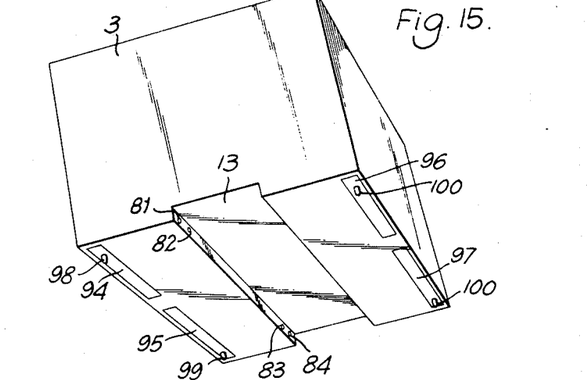
FIG. 15 shows the container in FIG. 14, in a perspective drawing seen from below.

The sled 65 and the pegs 77 and 78 belonging to it are used as mentioned for coupling with the carriers during reloading, and for example the carriers can be shaped as containers of the main type as shown in FIGS. 14 and 15. The container 3 in FIG. 14 has a longitudinal steering tunnel 13 in its bottom, and in the two side walls in this steering tunnel there are two holes or recesses 81,82,83,84 provided in both ends of the container. Corresponding holes or recesses are located in the opposite not visible side wall in FIG. 15. It can be seen that when the container 3 stands as indicated in FIG. 6 on a railway car, the sled 12, respectively 65 can be driven into the steering tunnel and be coupled together with the container by means of the pegs 77 – 80 which are driven out of and into the respective holes 81, 82 and into the holes lying opposite and not shown. By means of the working cylinder 76 and sled can then be drawn back, and the container will then be drawn along over onto the truck. If desired, one can take a different hold, i.e. that the sled is uncoupled from the container and driven out again and coupled together with the holes 83, 84 and the corresponding holes in the opposite side wall in the steering tunnel. When drawing in anew by means of the working cylinder 76, the container can then be drawn even further in onto the truck. The locking pegs 34, 35, 36, 37 will engage with the corresponding holes in the carriers' undersides when the carrying platform 9 or 20 is lowered when the reloading is terminated. The system can be completed with additional equipment for the railway cars. In this connection reference is made to FIG. 16 which shows a possible guide device which can be placed on the railway car's platform. This guide device 85 consists of two angle profiles 86 and 87 which are shaped at the ends so that the vertical flanges have steering pegs 88 on the underside intended to be put down in holes 89 placed for this purpose in the loading platform of the car. The two angle profiles are mutually braced by means of three rods 90. The guide device's 85 width is adjusted to the tunnel's 13 width and serves therefore as a guide, especially for loading of the containers onto the railway car.

Figure 16:
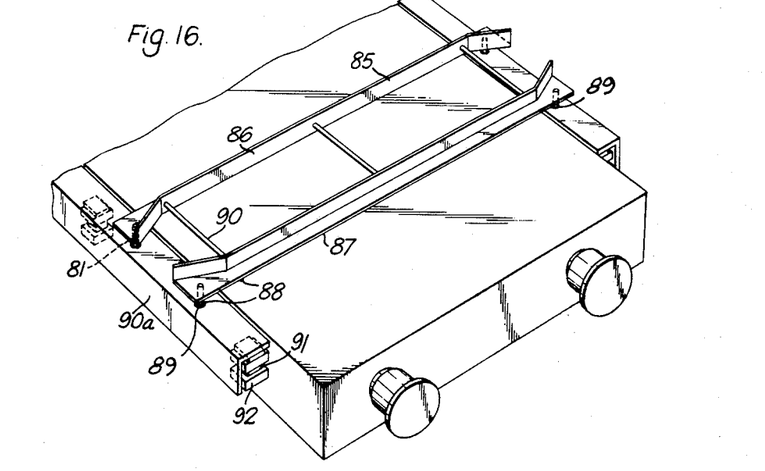
FIG. 16 shows a section of a railway car seen in perspective, with guide device and stopper.

A sturdy angle profile 90a has on its horizontal flange pegs 91 which fit into the usual stake fastenings 92 in the car. In this way the sturdy angle profile can be mounted along the side edges of the railway car, and it serves then appropriately as a stopper for the truck when it backs up into position, so that the truck is orientated correctly in relation to the centre line of the railway car. This makes coupling with the sled easier, because the containers during the loading are put together in such a way that they are symmetrically placed in relation to the centre line of the railway car and by driving the working cylinder 76 fully out, the sled will, at the termination of the working stroke, stand in correct position in relation to the coupling holes in the containers.

Instead of containers other carriers can of course be used, e.g. pallets. The steering tunnel does not necessarily have to be shaped as a real tunnel, as it is in FIGS. 14 and 15, but can also be made of depending elements, e.g. profiles, which between them form the necessary steering tunnel.

In order to additionally complete the system, the carriers can be equipped with legs which can be let down and which are used when the carriers are to be put on or be taken on off the truck. The legs are let down after the carrying platform which can be raised and lowered, has first been lifted up slightly. When the carrying platform is then lowered, the weight is then transferred to the legs and the truck can drive away. An example of these legs is shown in FIGS. 14 and 15, where the legs 94–97 are indicated. The legs (though not shown in detail) are pivotally mounted under the carrier and can be swung entirely up into the latter when they are not being used. It is an advantage if the legs are equipped with the necessary locking fittings 98, 99, 100, 101, intended for interaction with locking members, for instance the locking members 34, 35, 36, 37 on the truck. Such a placing of the locking members is advantageous, because the legs cannot always be placed outside the areas where the locking fittings necessarily must be placed taking into consideration the normal dimensions one must maintain. As the locking fittings are necessary only when the legs are drawn up, it is therefore an advantage to place them on the legs, as the locking fittings then will be placed correctly on the carrier when the legs are drawn up.

Of course one is not tied to the use of a so-called open railway car. The system can also be used with slight modifications for so-called closed railway cars of the type where the whole railway car's wall can be opened.

Figure 17:
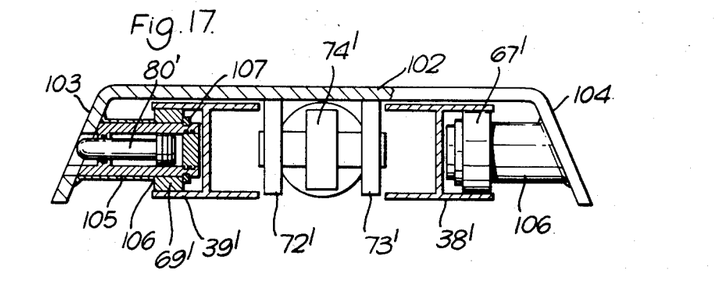
FIG. 17 shows a section as in FIG. 13 of a modified version of the sled.

FIG. 17 shows a partial section of a modified version of the sled. The two beams 38' and 39' correspond to the beams 38 and 39 in FIG. 13. The sled itself in this embodiment comprises a plate member 102 with depending flanges 103 and 104 and brackets 72', 73'. As in FIG. 13, the end of a piston 74' is connected to the sled between the two said brackets. On the inner side of each flange 103, 104 a cylindrical body 105, 106 respectively is mounted. Each cylindrical body (there are four of them) forms a bearing support for a roller 67', 69' which corresponds to the rollers 67, 69 in FIG. 13 and supports the sled in the beams 38' and 39'. The rollers abut a shoulder 106 and are held in place by a spring washer 107. In addition, each cylindrical body 106, 105 forms the cylinder of a working cylinder, the piston of a working cylinder, the piston of which at the same time acting as a locking peg 80' corresponding to the locking pegs 80, 79, 77 and 78 in FIG. 13.

In a manner not shown the cylinders on both sides of the peg piston are connected with a pressure source so that the peg may be driven in and out for freeing and locking of the sled relative the carrier. This construction of the sled is preferred when it is important to reduce the height of the sled above the ground.

The system may of course be used also for trucks carrying only one carrier or container. In such cases the tunnel in the bottom of the carrier preferably has centrally arranged openings adapted to receive the sled pegs thus enabling the carrier to be drawn further forwards towards the drivers cabin.

Having described our invention, we claim:

1. A system for handling goods on carriers for combined railway and overland transportation, comprising a truck having a carrying platform thereon that extends lengthwise of the truck, means to raise and lower the platform to adjust the platform to the height of a railway car, a sled that is movable lengthwise of the truck on guides on the carrying platform, means for moving the sled lengthwise along the platform to push or pull carriers along the platform lengthwise of the truck to or from a railway car, pegs on the sled that are movable transversely of the direction of movement of the sled along the platform, and means for moving said pegs transversely of the direction of movement of the sled along the platform thereby selectively to engage or withdraw said pegs from recesses or holes in the carriers to connect or disconnect the sled from the carriers.

2. A system as claimed in claim 1, each carrier having in its bottom a steering tunnel for the sled in which said recesses or holes are disposed.

3. A system as claimed in claim 1, said recesses or holes being disposed on opposite sides of the tunnel.

4. A system as claimed in claim 1, in combination with a railway car having detachable fittings for the rear end of the truck along each side of the car, for correct orientation of the truck's platform relative to the longitudinal axis of the railway car.

5. A system as claimed in claim 1, said carrier having legs that can be let down to support the carrier about the platform when the platform is lowered, the carrier's legs having locking means that coact with locking means on the truck thereby releasably to secure the carrier to the truck when the carrier legs are drawn up.

* * * * *